(12) United States Patent
Rauschmayer et al.

(10) Patent No.: US 8,291,251 B2
(45) Date of Patent: Oct. 16, 2012

(54) SYSTEMS AND METHODS FOR MODULAR POWER MANAGEMENT

(75) Inventors: Richard Rauschmayer, Longmont, CO (US); Steven E. Strauss, Orefield, PA (US); Tatsuya Sakai, Kanagawa (JP)

(73) Assignee: Agere Systems Inc., Allentown, PA (US)

( * ) Notice: Subject to any disclaimer, the term of this patent is extended or adjusted under 35 U.S.C. 154(b) by 926 days.

(21) Appl. No.: 12/280,790

(22) PCT Filed: Jul. 18, 2006

(86) PCT No.: PCT/US2006/027931
§ 371 (c)(1),
(2), (4) Date: Aug. 26, 2008

(87) PCT Pub. No.: WO2008/010795
PCT Pub. Date: Jan. 24, 2008

(65) Prior Publication Data
US 2010/0205462 A1    Aug. 12, 2010

(51) Int. Cl.
*G06F 1/00* (2006.01)
(52) U.S. Cl. .......................... 713/324; 307/43
(58) Field of Classification Search .......... 713/300–340, 713/400; 307/43, 69, 72–75, 85–87; 327/544; 257/691
See application file for complete search history.

(56) References Cited

U.S. PATENT DOCUMENTS

| | | |
|---|---|---|
| 5,544,138 A | 8/1996 | Bajorek et al. |
| 5,715,467 A | 2/1998 | Jirgal |
| 6,233,690 B1 | 5/2001 | Choi et al. |
| 6,396,137 B1 * | 5/2002 | Klughart ........................ 257/691 |
| 6,535,056 B2 | 3/2003 | Mizumo |

(Continued)

FOREIGN PATENT DOCUMENTS
EP    0 623 869    11/1994
(Continued)

OTHER PUBLICATIONS

U.S. Appl. No. 12/425,507, filed Apr. 17, 2009, Nation et al.
(Continued)

*Primary Examiner* — Clifford Knoll
(74) *Attorney, Agent, or Firm* — Hamilton DeSanctis & Cha (57) ABSTRACT

Various systems and methods for power management are disclosed herein. For example, a modular, adaptive power management system for use in a hard disk drive system is disclosed. This modular, adaptive power management system includes a hard disk drive controller, a read channel module, a host interface controller and a power manager system. The hard disk controller includes a processor executing firmware, and the host interface controller provides for host access via a host interface. The host interface may be, for example, an ATA interface, a SATA interface, and/or other emerging serial interfaces such as MMC, CE-ATA or SDIO. The power manager system includes a power island register and an oscillation control register. Both the power island register and the oscillation control register are each at least indirectly writable via the firmware and via the host interface. The hard disk controller, the interface controller, the read channel module and the power manager system are implemented across two or more distinct power islands and use two or more distinct clocks. Power to the two or more distinct power islands is at least in part controlled by the power manager system via the power island register, and the two or more distinct clocks are each controlled by the power manager system via the oscillation control register.

25 Claims, 6 Drawing Sheets

U.S. PATENT DOCUMENTS

| | | | |
|---|---|---|---|
| 6,720,673 B2 * | 4/2004 | Blanco et al. | 307/64 |
| 6,804,792 B2 | 10/2004 | Nishikawa | |
| 6,973,583 B2 | 12/2005 | Kobori | |
| 6,983,389 B1 | 1/2006 | Filippo | |
| 7,055,117 B2 | 5/2006 | Yee | |
| 7,203,857 B2 | 4/2007 | Hamilton | |
| 7,254,732 B2 * | 8/2007 | Bashford et al. | 713/324 |
| 2003/0131274 A1 | 7/2003 | Mizuyabu et al. | |
| 2003/0235103 A1 | 12/2003 | Raad | |
| 2004/0255177 A1 | 12/2004 | Hamilton | |
| 2005/0163237 A1 | 7/2005 | Katanaya | |
| 2006/0107077 A1 | 5/2006 | Roth et al. | |
| 2006/0123259 A1 | 6/2006 | Yokota et al. | |
| 2008/0077818 A1 | 3/2008 | Rauschmayer | |
| 2010/0218020 A1 | 8/2010 | Rauschmayer et al. | |
| 2011/0260785 A1 * | 10/2011 | Hoberman et al. | 327/544 |

FOREIGN PATENT DOCUMENTS

| | | |
|---|---|---|
| JP | 6152288 | 5/1994 |
| JP | 2004-118240 | 4/2004 |
| WO | WO 2004/023268 | 3/2004 |
| WO | WO-2004023268 A2 | 3/2004 |
| WO | WO 2004/109531 | 12/2004 |

OTHER PUBLICATIONS

U.S. Appl. No. 12/425,532, filed Apr. 17, 2009, Nation et al.
U.S. Appl. No. 12/425,547, filed Apr. 17, 2009, Nation et al.
International Business Machines, "Adaptive Power Management for Mobile Hard Drives", white paper dated Apr. 1999. See www.almaden.ibm.com/almaden/mobile_hard_drives.html.
International Business Machines, "Adaptive Power Management for Mobile Hard Drives", white paper dated Apr. 1999. See http://www.almaden.ibm.com/almaden/mobile_hard_drives.html.

* cited by examiner

SYSTEMS AND METHODS FOR MODULAR POWER MANAGEMENT

TECHNICAL FIELD

The present invention is related to systems and methods for managing power dissipation in electrical systems, and in particular to systems and methods for managing power consumption of a hard disk drive system.

BACKGROUND ART

A hard disk drive is a complex electrical-mechanical system that is further complicated due to both power concerns and heat dissipation issues. These power concerns and heat dissipation issues have been addressed from various individual perspectives including low power application specific semiconductor design; or use of one of hardware, firmware, or software to reduce clocking speeds. As one example, some hard disk drives rely on software commands from a host to govern power dissipation. Such host commands are typically delivered via an ATA bus and are very coarse in nature. This lack of refinement results in an inability to effectively manage power in a hard disk drive while maintaining an acceptable level of drive operation.

Thus, for at least the aforementioned reasons, there exists a need in the art for advanced systems and methods for power management.

SUMMARY DISCLOSURE OF INVENTION

The present invention is related to systems and methods for managing power dissipation in electrical systems, and in particular to systems and methods for managing power consumption of a disk drive.

Various embodiments of the present invention provide modular, adaptive power management systems. Such modular, adaptive power management systems include a hard disk drive controller, a read channel module, a host interface controller and a power manager system. The hard disk controller includes a processor executing firmware, and the host interface controller provides for host access via a host interface. The host or translator interface may be, for example, an ATA interface, a SATA interface, and/or other emerging serial interfaces such as MMC, CE-ATA or SDIO. The power manager system includes a power island register and an oscillation control register. Both the power island register and the oscillation control register are each at least indirectly writable via the firmware and/or via the host interface. The hard disk controller, the interface controller, the read channel module and the power manager system are implemented across two or more distinct power islands and use two or more distinct clocks. Power to the two or more distinct power islands is at least in part controlled by the power manager system via the power island register, and the two or more distinct clocks are each controlled by the power manager system via the oscillation control register.

Other embodiments of the present invention provide reusable, modular power management circuits for use in a variety of systems. Such power management circuits include a power island control register and an oscillation control register. The power island control register is associated with a number of power island control bits, and each of the power island control bits is operable to disable power to a given power island. The oscillation control register is associated with a number of oscillation control bits, and each of the oscillation control bits is operable to disable a given clock. The circuits further include a translator interface. The translator interface is operable to receive a standard power management command and to translate the standard power management command into a write to the power island control register and the oscillation control register. The write to the power island control register and the oscillation control register implements a tailored power management scheme related to the standard power management command. In some cases, the standard power management command is an ATA or SATA command, or a command associated with one of the emerging serial interfaces such as MMC, CE-ATA or SDIO.

In some instances of the aforementioned embodiments of the present invention, the circuits further include an embedded processor executing firmware. Such an embedded processor may at least in part controls operation of the translator interface. In some cases, the firmware is upgradeable. In one particular case of the aforementioned embodiments of the present invention, one of the oscillation control bits is operable to disable an oscillator, another of the oscillation control bits is operable to gate all clocks derived from the oscillator, and yet another of the oscillation control bits is operable to gate less than all clocks derived from the oscillator.

Yet other embodiments of the present invention provide hard disk drive systems that include a hard disk controller, an interface controller, a read channel module and a power manager system. The hard disk controller, the interface controller, the read channel module and the power manager system are implemented across two or more distinct power islands, and power to the two or more distinct power islands is at least in part controlled by the power manager system. In some cases, the hard disk controller, the interface controller, the read channel module and the power manager system utilize two or more distinct clocks, and the two or more distinct clocks are each controlled by the power manager system. In some cases, the interface controller is operable to provide a host interface such as, for example, an ATA interface, a SATA interface, and/or other emerging serial interfaces such as MMC, CE-ATA or SDIO. In various cases, the hard disk drive system further includes a processor executing firmware. In such cases, the firmware is operable to implement an adaptive power management scheme via the power manager system. In particular cases, the interface controller is operable to provide a translator interface that is operable to receive a host command that causes a selected power mode to be implemented via the power manager system.

Yet further embodiments of the present invention provide modular, adaptive power management systems that include a power island controller and an oscillation controller. The oscillation controller and the power island controller are implemented in a modular power management circuit. In some cases, the power management system further includes a processor with firmware executable to operate the power management system. Further, in some cases the power management system is deployed in relation to a device that includes two or more power islands. In such cases, the power island controller includes one register bit writable by the firmware and operable to disable power to one of the power islands and another register bit writable by the firmware and operable to disable power to another of the power islands. In some cases, the firmware is operable to implement an adaptive power management scheme.

In yet other cases of the aforementioned embodiments, the power management system further includes a host interface. In such cases, the aforementioned register bits are writable via the host interface. In particular cases, a host communicating via the host interface commands implementation of a coarse power management scheme. In such cases, the firmware may be operable to implement a finer adaptive power management scheme. In some cases, the power management system is register based and is deployable in relation to a variety of host systems.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

MODES FOR CARRYING OUT THE INVENTION

The present invention is related to systems and methods for managing power dissipation in electrical systems, and in particular to systems and methods for managing power consumption of a hard disk drive system.

A great number of computer devices employ hard disk drives. For example, hard disk drives are commonly incorporated into personal computers including both desktop and laptop computers. In addition, a number of consumer electronic devices are beginning to incorporate hard disk drives as a mechanism for increasing storage capacity for the device. For example, it is becoming common for digital video cameras, digital still cameras, personal digital assistants, cellular telephones and the like to incorporate hard disk drives. The devices are often being operated at very high clock speeds and demand relatively low access times for data from an associated hard disk drive. High speed hard disk drives may be implemented by increasing the rate at which data carrying platters are rotated in relation to a read/write head assembly. As these platters are connected to a rotating spindle, the speed at which the platters are rotating is often referred to as spindle speed. Increasing the spindle speed not only increases the rate at which data can be accessed from the platter during sequential accesses, but also reduces the rotational latency resulting in a reduction in the average time required to perform a random data access. Because of the advantages of increased spindle speed, there continues to be a push to further increase spindle speeds.

Increasing spindle speed results in an increase in vibration energy and heat energy each of which is detrimental to operation of a hard disk drive. By introducing effective power management, the increase in heat energy can be mitigated allowing for the increased performance of a hard disk drive. While power management is paramount in hard disk drives destined for deployment in mobile consumer electronics devices, power management is also of appreciable importance for hard disk drives destined for deployment in larger, less mobile devices such as laptop personal computers and even enterprise applications.

Various embodiments of the present invention work in concert with existing techniques to adaptively control active power of a hard disk drive to obtain a finely tailored power management able to limit power dissipation while at the same time providing a desired performance level. Such embodiments of the present invention may include adaptive transitioning from lower power dissipation modes to higher power dissipation modes and/or from higher power dissipation modes to lower power dissipation modes with a level of fineness not offered via control from, for example, host commands delivered via a standard ATA bus. In some embodiments of the present invention, the aforementioned adaptive power management systems are implemented as a dedicated power management controller. Such a dedicated power management controller may be modular such that it may be tailored for and deployed in relation a variety of hard disk drive designs and/or other system designs.

Various embodiments of the present invention provide modular, adaptive power management systems. Such modular, adaptive power management systems include a hard disk drive controller, a read channel module, a host interface controller and a power manager system. The hard disk controller includes a processor executing firmware, and the host interface controller provides for host access via a host interface. The host or translator interface may be, for example, an ATA interface, a SATA interface, and/or other emerging serial interfaces such as MMC, CE-ATA or SDIO. The power manager system includes a power island register and an oscillation control register. As used herein, the term "register" is used in its broadest sense to mean any memory element. Thus, in some cases, a register may be a single flip-flop or latch, a group of flip-flops or latches, or some other addressable memory element. It should be noted that a "register" may comprise a subset or superset of individual register bits that may be written and/or read at a given address or memory address. Both the power island register and the oscillation control register are each at least indirectly writable via the firmware and/or via the host interface. The hard disk controller, the interface controller, the read channel module and the power manager system are implemented across two or more distinct power islands and use two or more distinct clocks. As used herein, the phrase "power island" is used in its broadest sense to mean any area that is supplied by a power source and is controllable apart from other areas of a given system. Power to the two or more distinct power islands is at least in part controlled by the power manager system via the power island register, and the two or more distinct clocks are each controlled by the power manager system via the oscillation control register.

Figure 1:
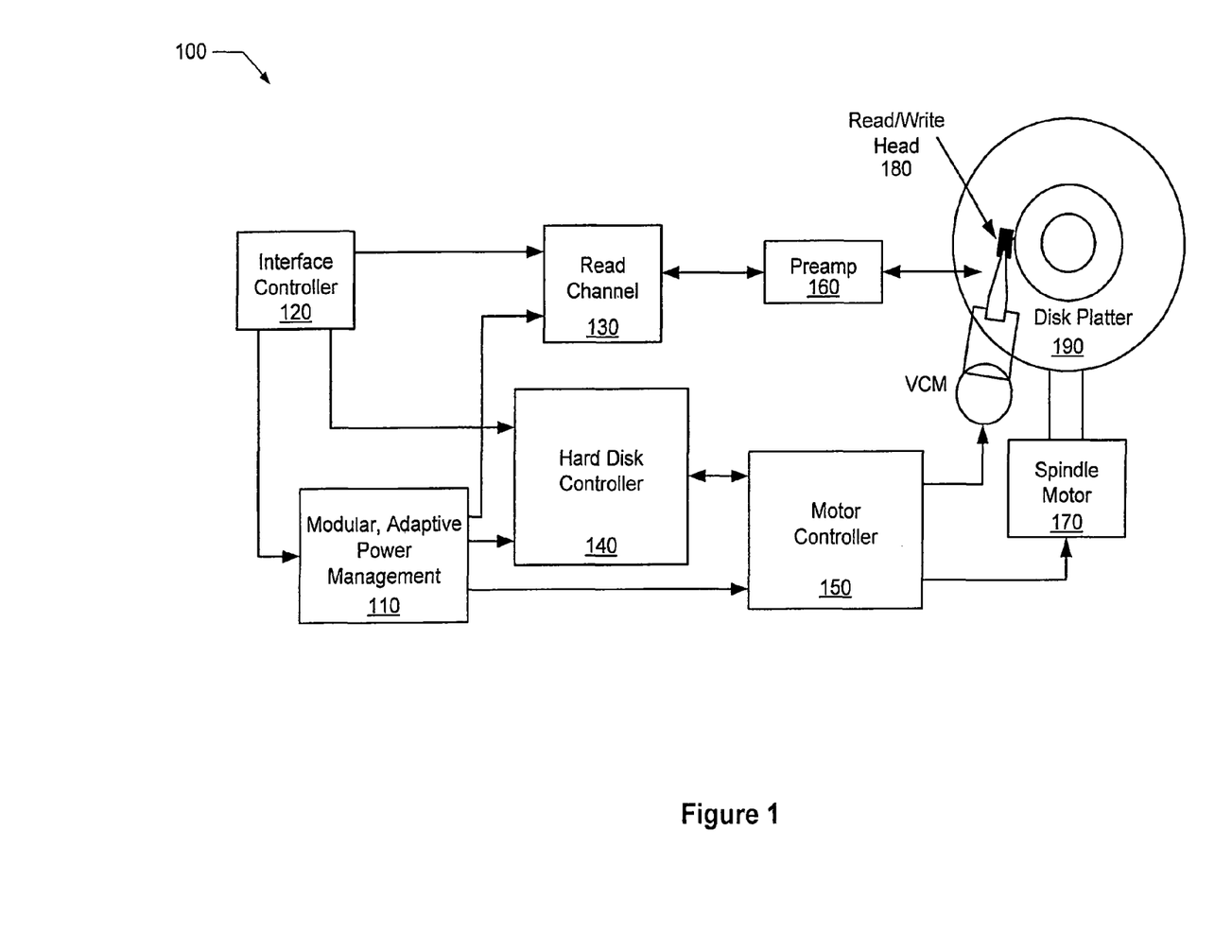
FIG. 1 depicts a hard disk drive system incorporating a modular, adaptive power management module in accordance with various embodiments of the present invention.

Turning to FIG. 1, a hard disk drive system 100 including a modular, adaptive power management module 110 in accordance with one or more embodiments of the present invention is depicted. In some embodiments of the present invention, modular, adaptive power management module 110 is implemented as a modular design that may be deployed in a number of different devices and/or customized for operation in one or more devices. In other embodiments of the present invention, modular, adaptive power management module 110 may provide one or more of host commanded power management, adaptive power management under firmware control, and/or hardwired adaptive power management. In yet other embodiments of the present invention, modular, adaptive power management module 110 provides both modularity of design and adaptive power management. In yet further embodiments of the present invention, modular, adaptive power management module 110 provides modularity of design, adaptive power management, and host commanded power management. In addition to modular, adaptive power management module 110, hard disk drive system 100 includes an interface controller 120, a read channel module 130, a hard disk controller 140, a motor controller 150, a preamp 160, a spindle motor 170, a read/write head assembly 180, and a disk platter 190.

Interface controller 120 may be any interface tailored to allow commands to pass to and/or from a host controller. Thus, host interface controller may be, but is not limited to, an ATA interface controller, an SATA interface controller, an MMC interface controller, a CE-ATA interface controller, or an SDIO interface controller. Based on the disclosure provided herein, one of ordinary skill in the art will recognize a variety of interface controllers that may be implemented in relation to one or more embodiments of the present invention.

The data on disk platter 190 consists of groups of magnetic signals that may be detected by read/write head assembly 180 when the assembly is properly positioned over disk platter 190. In a typical read operation, read/write head assembly 180 is accurately positioned by motor controller 150 over a desired data track on disk platter 190. Motor controller 150 both positions read/write head assembly 180 in relation to disk platter 190 and drives spindle motor 170 by moving read/write head assembly to the proper data track on disk platter 190 under the direction of hard disk controller 140. Spindle motor 170 spins disk platter 190 at a determined spin rate (RPMs).

Once read/write head assembly 190 is positioned adjacent the proper data track, magnetic signals representing data on disk platter 190 are sensed by read/write head assembly 180 as disk platter 190 is rotated by spindle motor 170. The sensed magnetic signals are provided as a continuous, minute analog signal representative of the magnetic data on disk platter 190. This minute analog signal is transferred from read/write head assembly 180 to read channel module 130 via preamp 160. Preamp 160 is operable to amplify the minute analog signals accessed from disk platter 190. In addition, preamp 160 is operable to amplify data from read channel module 130 that is destined to be written to disk platter 190. In turn, read channel module 130 digitizes the received analog signal to recreate the digital data originally written to disk platter 190. The digitized data is provided via interface controller 120 to a host computer or device governing operation of hard disk drive system 100.

A write operation is substantially the opposite of the preceding read operation with digital data being received from a host via interface controller 120. The digital data is provided to read channel module 130 and to hard disk controller 140. Hard disk controller 140 commands the proper positioning of read/write head assembly 180 adjacent a particular data track on data platter 190 and the desired rotational speed of disk platter 190 via motor controller 150. Once the aforementioned commands are implemented, the digital data is converted to an analog data stream by read channel module 130 and provided to read/write head assembly via preamp 160. In turn, read/write head assembly 180 writes the data to disk platter 190.

In various cases, the previously described read and write operations are not continuously utilized, and thus there is an opportunity for power management. Modular, adaptive power management module 110 provides such power management to hard disk drive system 100. In some particular embodiments of the present invention, modular, adaptive power management module 110 provides programmable power management to provide greater drive energy efficiency while satisfying desired system performance.

As previously suggested, in one or more embodiments of the present invention, modular, adaptive power management module 110 is a stand-alone circuit that acts to distribute clocks and enables to the other major sub-blocks within hard disk drive system 100. In some embodiments of the present invention, modular, adaptive power management module 110 supports a number of registers that allow firmware executing on hard disk controller 140 to control the power distribution to various other circuitry of hard disk drive system 100. Modular, adaptive power management module 110 may utilize a number of power management techniques in concert to control the overall power dissipation of hard disk drive system 100. In one particular embodiment of the present invention, modular, adaptive power management module 110 includes an ability to enable and disable the overall system clock synchronizing operation of hard disk drive system 100. In one particular case, such an ability may be provided by gating the overall system clock, while in other cases the aforementioned ability may be providing by removing power from an oscillator circuit responsible for generating the overall system clock.

In addition, modular, adaptive power management module 110 may include an ability to enable and disable sub-clocks of the of the overall system clock. Thus, for example, modular, adaptive power management module 110 may include an ability to disable a clock provided to read channel module 130, and to simultaneously enable a clock provided to interface controller 120. It should be noted that modular, adaptive power management module 110 may be implemented on the same piece of silicon as other elements of hard disk drive system 100, or apart from one or more of the other elements on a different piece of silicon and/or on a different package.

The aforementioned approaches of clock gating and/or clock turn-off can be used to dramatically reduce the amount of dynamic power dissipated in a CMOS circuit. This is typically sufficient as the dynamic power dissipation in a given circuit may be many times that of the static power (e.g., leakage current) dissipation. However, it may be advantageous to additionally control leakage current. Hence, some embodiments of the present invention also provide an ability to limit leakage current. In particular, in some embodiments of the present invention modular, adaptive power management module 110 includes an ability to shut off power to individual portions of hard disk drive system 100. In such cases, the individual design portions may be arranged in power islands or areas where a variety of circuitry share a common power source that are distinct from other areas of circuitry. Thus, for example, read channel module 130 and interface controller 120 may be implemented such that they receive power from an overall power supply, but that power to each of read channel module 130 and interface controller 120 may be separately disabled and enabled. Thus, by disabling power to read module 130 and enabling power to interface controller 120, both dynamic and static power dissipation by read channel module 130 is eliminated, and yet the functionality of interface controller 120 is maintained.

This multi-voltage island topology becomes increasingly important as designs continue to transition through different technologies. For example, in one technology the dynamic power dissipation may dwarf any static power dissipation. However, in another technology, static power dissipation may be significant compared to dynamic power dissipation. In particular, in some technologies leakage issues may be major contributors to any overall power dissipation. Shutting down un-used logic completely by removing its power source removes this leakage parameter and thereby lowers the overall system power consumption in the Standby and Sleep modes of operation.

In some particular embodiments of the present invention, modular, adaptive power management module 110 includes an interface to interface controller 120 that in some embodiments of the present invention is used by hard disk drive system 100 to receive power management commands from a host controller. Thus, as just one of many examples, a host may command three levels of operation: awake, standby and sleep. No matter which mode is selected, when a media access command such as the previously described read and write commands is received, hard disk drive system 100 must initiate operations to service the received command. Depending upon the mode in which hard disk drive 100 is currently operating, initiating operations to service the received command may take different amounts of time. Thus, there exists a tradeoff between response time and power dissipation. This trade off can vary with how much the device is currently being used and how quick of a response time is required by a given application. Thus, for example, in portable devices where power is at a premium, response time may be sacrificed in order to minimize power dissipation. In contrast, for a fixed device that has an unlimited source of power, response time may be more important and a less aggressive power management scheme may be implemented.

In particular, when commanded to operate in the awake mode, modular, adaptive power management module 110 would assure power distribution sufficient to respond to read and write requests with only a minimum of delay. In contrast, when commanded to operate in standby mode, modular, adaptive power management module 110 would minimize power dissipation while at the same time providing a predetermined delayed response time that would allow for full distribution of power upon receiving a read or write request. As yet another contrast, when commanded to operate in sleep mode, modular, adaptive power management module 110 would drastically curtail power distribution such that a significant delay would be incurred any time it was necessary to respond to a received read or write request. In some cases, such a sleep mode may include a nearly complete elimination of power from hard disk drive system 100. Such a complete removal of power provides for dramatic power savings and in some cases where substantial caching is provided by a host computer or device, the negative effects of such a power down are limited. As one example, an MP3 device may utilize a very low power high latency approach where a substantial amount of audio data is maintained in a system cache. In some embodiments of the present invention, programmability is provided in modular, adaptive power management module 110 to allow it to be used where either an aggressive power management scheme or a less aggressive power management scheme is to be implemented. Such programmability may be implemented via a number of control registers included in modular, adaptive power management module 110 that are accessible via a processor executing firmware and implemented as part of hard disk controller 140. This allows modular, adaptive power management module 110 to be re-used and leveraged across multiple designs and/or application spaces. A user may tailor the tradeoff between response time and power dissipation depending upon the particular application requirements.

Various host interfaces exist for communicating with hard disk drive system 100. Such host interfaces typically include a predetermined power management strategy that may or may not operate optimally with a particular hard disk drive system 100. For example, the ATA interface is well known and offers a stable interface standard to which the industry may design. However, the stability of the standard makes it difficult to adapt for optimal power management. The power management commands offered as part of the ATA standard are generic and apply to any type of device communicating via an ATA bus interface. Such abstraction provides for only coarse power management and is hardly tailored for a particular hard disk drive-implementations. Further, in many cases a particular host may not implement a very aggressive power management scheme.

Some embodiments of the present invention provide a self-management or adaptive power management scheme that operates in addition to the host commands. In some cases, the host commanded power management operates as a coarse power management and the self management operates as a fine control within the aforementioned coarse control. In embodiments where adaptive power management is provided in addition to host commanded power management, such adaptive power management may operate within the range commanded by the host. Thus, for example, where the host commands operation in the awake mode, adaptive power management may be implemented to provide an adaptively changing power dissipation ranging between the upper end of the awake mode to the upper end of the standby mode. Similarly, where the host commands operation in the standby mode, adaptive power management may be implemented to provide an adaptively changing power dissipation ranging between the upper end of the standby mode to the upper end of the sleep mode.

Figure 2:
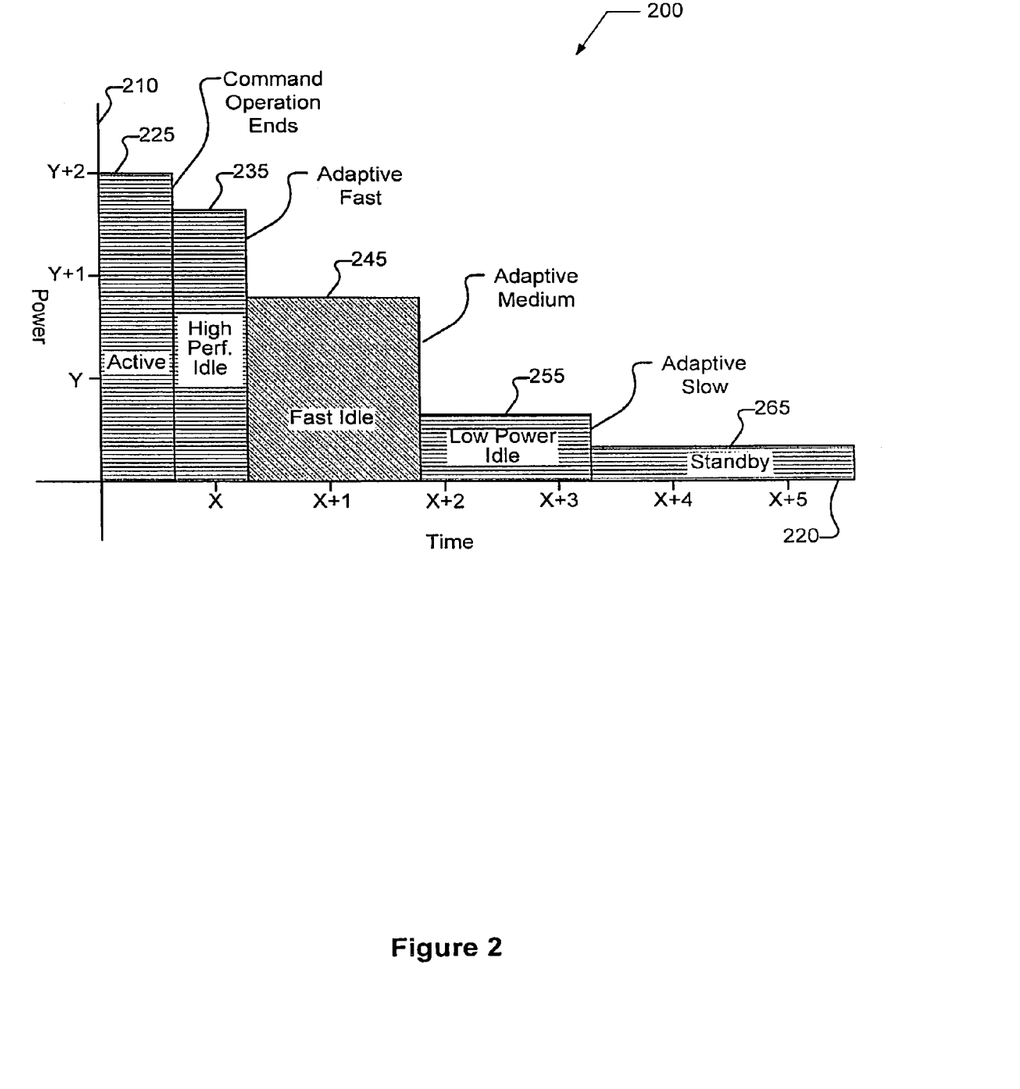
FIG. 2 is a graph showing an exemplary adaptive transition between different power levels in the active state in accordance with one or more embodiments of the present invention.

Turning to FIG. 2, a graph 200 showing an exemplary adaptive transition between different power levels in the active state is shown. Graph 200 includes a power axis 210 and a time axis 220. Initially, as shown by block 225, hard disk drive system 100 is actively processing a read or a write command. During this period hard disk drive system 100 is fully operational and the power dissipated thereby is at its maximum. Once the command(s) are finished processing, hard disk drive system 100 is transitioned to a high performance idle state represented by a block 235. In this state hard disk drive system is still substantially operational and only a small reduction in power is available. Further, in this state no appreciable delay is incurred in accepting and handling a subsequent command. As one example, the tri-state busses may be placed in a tri-state condition during this state while other logic remains fully enabled.

After a predetermined period of inactivity, hard disk drive system 100 is transitioned to a fast idle state represented by a block 245. In the fast idle state additional avenues of power dissipation are eliminated at the expense of added latency in responding to a subsequent incoming command. Similarly, after an additional predetermined period of time, hard disk drive system 100 is transitioned to a low power idle state represented by a block 255. In the low power idle state yet further avenues of power dissipation are eliminated at the expense of added latency in responding to a subsequent incoming command. Ultimately, after some additional delay, hard disk drive 100 is transitioned into a standby power state. Thus, while a host bus may be used to command coarse power states (e.g., active, standby and sleep), adaptive power management may be employed to modify power usage at finer levels between the host commanded coarse levels. Alternatively, where host command is not available, the standby state may be considered just another power state through which the adaptive power management transitions.

Figure 3A:
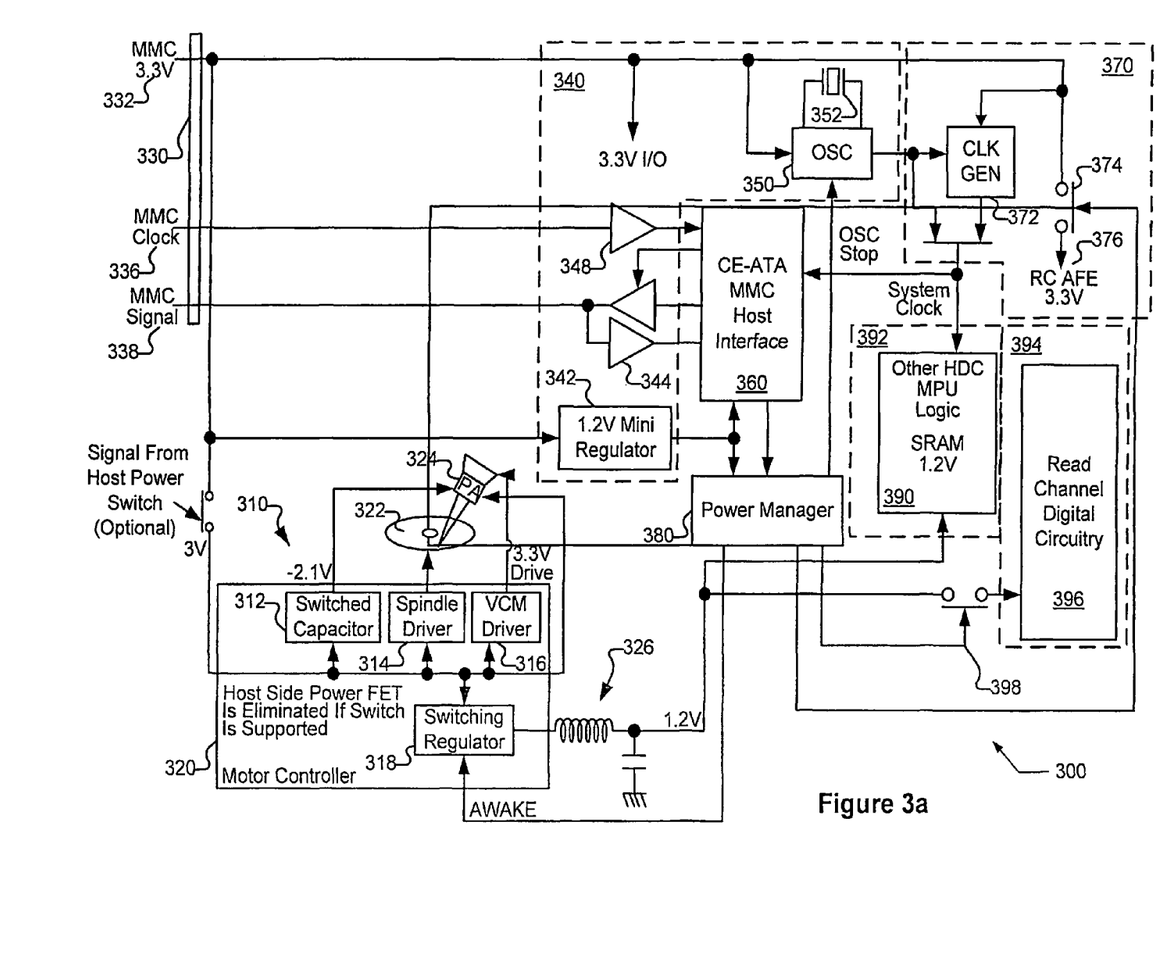
FIGS. 3a and 3b illustrate different systems including power islands under control of a power manager system in accordance with various embodiments of the present invention.
Figure 3B:
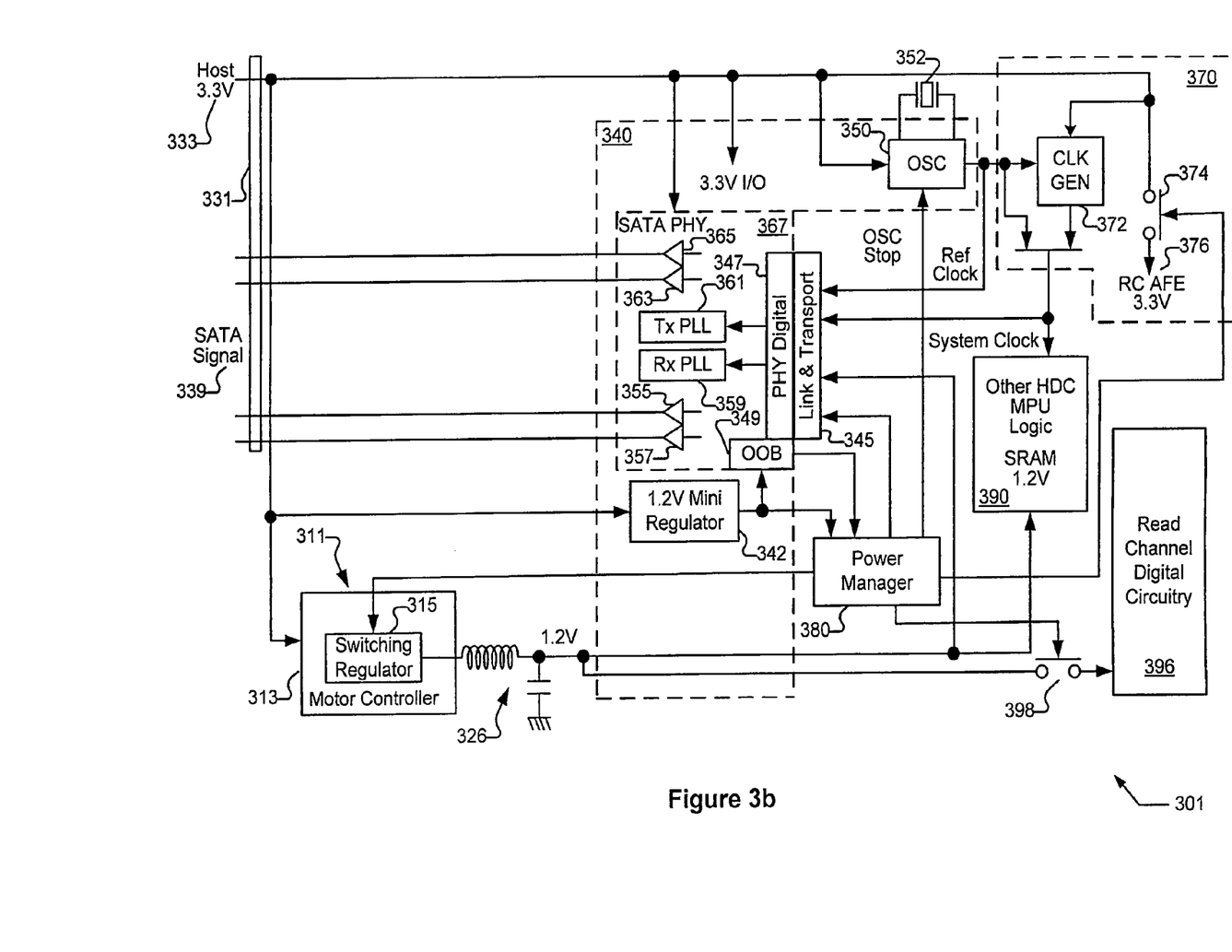

Turning now to FIG. 3, a system 300 tailored for use with an MMC interface and another system 301 tailored for use with a SATA interface are shown. It should be noted that the two systems are merely exemplary and that based on the disclosure provided herein, one of ordinary skill in the art will recognize a variety of systems in which power management in accordance with one or more embodiments of the present invention may be deployed. In particular, system 300 includes a standard controllable storage system 310 that includes a motor controller 320, a storage platter 322 and a read/write head assembly 324. Motor controller 320 includes a switching regulator 318, a switched capacitor 312, a spindle driver 314 and a voice coil motor driver 316. It should be noted that controllable storage system 310 is well known in the art and that one of ordinary skill in the art upon reading this disclosure would be able to replace controllable storage system 310 with other known systems to which power management in accordance with one or more embodiments of the present invention may be applied. Motor controller 320 is electrically coupled to a regulated power supply via an LC filter 326. Based on the disclosure provided herein, one of ordinary skill in the art will recognize other filters that may be used in relation to the present application.

System 300 further includes an MMC interface 330 by which MMC Power 332, an MMC clock 336 and an MMC signal 338 are provided to an MMC host interface circuit 360 via a clock buffer 348 and a tristate buffer 344. In addition, system 300 includes a mini-voltage regulator 342 operable to generate a 1.2 Volt power source from MMC Power 332. System 300 also includes an oscillator circuit 350 associated with a crystal oscillator 352. Further, system 300 includes a processor and/or other control logic 390 and a power manager circuit 380 in accordance with embodiments of the present invention. System 300 additionally includes a Clock Generation Circuit 372 and Read Channel Digital Circuitry 396.

Power manager circuit 380 provides for controlling power to various power islands 340, 370, 392 and 394 within system 300, as well as supplying distinct clocks to various portions of system 300. Power manager circuit 380 is responsible for gating one or more of the clocks to eliminate dynamic power dissipation associated with the respective portions, and for turning off power to one or more of power islands 340, 370, 392 and 394 to eliminate both dynamic and static power dissipation associated with the respective islands. In some cases, power manager circuit 380 and/or interface circuit 360 support responding to ATA/ATAPI commands running without use of an active clock. In such embodiments, oscillator circuit 350 may be turned off and yet system 300 may be revived using a host command.

System 300 is arranged into distinct power islands 340, 370, 392 and 394 each respectively including the circuitry shown within the adjacent dashed lines. For example, a switch 374 controlled by power manager circuit 380 may be opened such that power is removed from power island 370. As such, all power to Clock Generation Circuit 372 is removed eliminating not only dynamic power dissipation, but also static power dissipation. Similarly, a switch 398 controlled by power manager circuit 380 may be opened such that power is removed from power island 394. As such, all power to Read Channel Digital Circuitry 396 is removed eliminating not only dynamic power dissipation, but also static power dissipation. While not shown, switches may also be deployed in relation to power island 340 and power island 392 such that power provided to the circuitry associated the particular power islands may be switched off and on under the control of power manager circuit 380. In some embodiments of the present invention, the aforementioned switches are controlled via register bits assigned to one or more of the switches. Thus, for example, switch 398 may be associated with a particular register bit within power manager circuit 380. When the register bit is written with a logic '1' switch 398 may be opened, and when it is written with a logic '0' switch 398 is closed. Further discussion of such register bits is provided below in relation to FIG. 4. Further, based on the disclosure provided herein, one of ordinary skill in the art will recognize a variety of controls that may be used to gate power to one or more of power islands 340, 370, 392 and 394.

System 300 is partitioned into power islands to allow various portions of system 300 that must be continuously powered to be separated from other portions of system 300 that may need to be powered only intermittently. Continuous power is maintained for portions of system 300 that are needed to sensitize system 300 to a wake-up condition and control the power-on sequencing of the system. Such continuously powered portions may be included in a power island that is "always-on" and in some cases is powered by a linear regulation element embedded into system 300. As will be appreciated by one of ordinary skill in the art upon reading this disclosure, the various power islands may be powered by a common power source, but are isolated one from another.

Similarly, power is controlled to controllable storage system 310 via an AWAKE signal 328. In the depicted embodiment of the present invention, power generation is integrated into motor controller 320. When AWAKE signal 328 is a logic '0', power is generated. Alternatively, when AWAKE signal 328 is a logic '1', power is not generated. AWAKE signal 328 may also shut down the power and control to the various motors that are available in a particular hard disk drive system including, for example, a spindle motor and a voice coil motor. Shutting down these motors and parking the heads represents a major system-level power savings, as these electro-mechanical interfaces traditionally consume a major portion of the system current in a hard disk drive system. In some embodiments of the present invention, AWAKE signal 328 is controlled via one or more register bits maintained as part of power manager circuit 380. Further discussion of such register bits is provided below in relation to FIG. 4. Based on the disclosure provided herein, one of ordinary skill in the art will recognize a variety of controls that may be used to gate power to controllable storage system 310.

In some embodiments of the present invention, one or more programmable discrete I/O are provided by power manager circuit 380 to control operation of system 300. For example, AWAKE signal 328 is provided that controls the power generation circuitry of controllable storage system 310. Other signals may be included to shut down all analog circuitry, to shut down the oscillator circuitry, and/or to shut down all non-essential digital circuitry. Based on the disclosure provided herein, one of ordinary skill in the art will recognize other I/O that may be included to control various other functionality.

In one particular embodiment of the present invention, the following exemplary power up sequence is implemented in system 300 when moving from a low power state to a higher power state:

(1) MMC clock 336 is monitored to detect activity at the host interface;
(2) Once host interface circuit 360 detects activity on MMC interface 330, power manager circuit 380 is notified;
(3) If host interface 360 determines that firmware control is necessary to revive system 300, power manager 380 is commanded to turn on all circuitry necessary to operate the firmware. In some cases, this includes resetting a Suicide bit as is further explained below in relation to FIG. 4;
(4) Power manager system 380 enables the internal system clock to host interface 360;
(5) Power manager system 380 awaits interaction by the firmware to set various register bits designed to cause the appropriate revival of system 300; and
(6) Power manager 380 implements the commands received from the firmware via the register bits of power manager system 380.

It should also be noted that various embodiments of the present invention may be designed to support multiple modes of operation. In each of the modes of operation, the interaction between host interface 360 and power manager system 380 may change slightly. However, the same power manager system 380 may be deployed to support the different intended mode of operation simply by changing firmware that interacts with power manager system 380.

For example, an ATA mode of operation may be implemented in accordance with one or more embodiments of the present invention. In such a case, a host generally controls the sequencing of the power down modes of operation via host interface 360. However, power manager system 380 may include additional, more aggressive power management features that can be used within the architecture of system 300 to better manage system power. In particular, adaptive power management in addition to the host commanded power management may be employed to gate clocks and switch power sources. This can be in addition to the standard SLEEP and STANDBY modes offered by an ATA bus. In STANDBY clocks are selectively shut down but power is not removed from the core voltage domain of system 300. All of the electro-mechanical interfaces can be shut down, however. When the host asks the drive to go into SLEEP, then a SUICIDE mode of operation can be initiated where power to system 300 is dramatically reduced.

As another example, an MMC/CE-ATA mode of operation may be implemented that is targeted for embedded applications. Such a mode provides a serialized physical interface that has an overriding ATA command set. In such a mode, the host offers little if any support in providing power down. In such an embodiment of the present invention, host interface 360 is modified to clock externally in some cases using MMC clock 336. If revival of system 300 is called for using such an external clock, the internal clock is enabled via power manager circuit 380 and the process of revival proceeds. In contrast, if host interface 360 determines that no revival is required then system 300 is maintained in its low power state. In some cases, system 300 may be modified to simultaneously support multiple modes of operation. For example, both an MMC/CE-ATA mode and an ATA mode may be simultaneously implemented on the same piece of silicon.

Turning to FIG. 3B, system 301 tailored for a SATA mode of operation is depicted. System 301 is substantially similar to the previously described system 300 except that controllable storage system 310 is replaced with a controllable circuit 311 consisting of a motor controller 313 and an associated switching regulator 315. In addition, a host interface 331 including a host power source 333 and a SATA signal 339 replaces host interface 330 of system 300. Further, host interface 360 and associated I/O of system 300 are replaced by a SATA PHY layer 367 with interface circuitry 345, 347, 349, 355, 357, 359, 361, 363 and 365.

Because system 301 includes SATA PHY layer 367, special consideration is given to the interaction between SATA PHY layer 367 and power manager circuit 380. A standard SATA interface includes three power states of interest: ACTIVE (SATA PHY layer is ready, fully powered and both transmit and receive are enabled); PARTIAL (reduced power capable of resuming operation in less than ten microseconds); and SLUMBER (reduced power capable of resuming operation in less than ten milliseconds). Thus, in contrast to aforementioned embodiments of the present invention, the defined power states require a predetermined transient response that must be accounted for in any operation of power manager circuit 380.

Embodiments of the present invention such as those depicted in FIG. 3 provide one or more advantageous features including, but not limited to adaptively controlling system power sequencing, system clocking and system reset generation. In some cases, only the minimum required blocks are activated as additional power is required to satisfy operational requirements. In particular, the combination of power island control and internal clocking control provides an effective ability to govern power dissipation concerns. Further, in some cases, an "always-on" power island is powered using mini-regulator 342 to manage leakage current.

Figure 4:
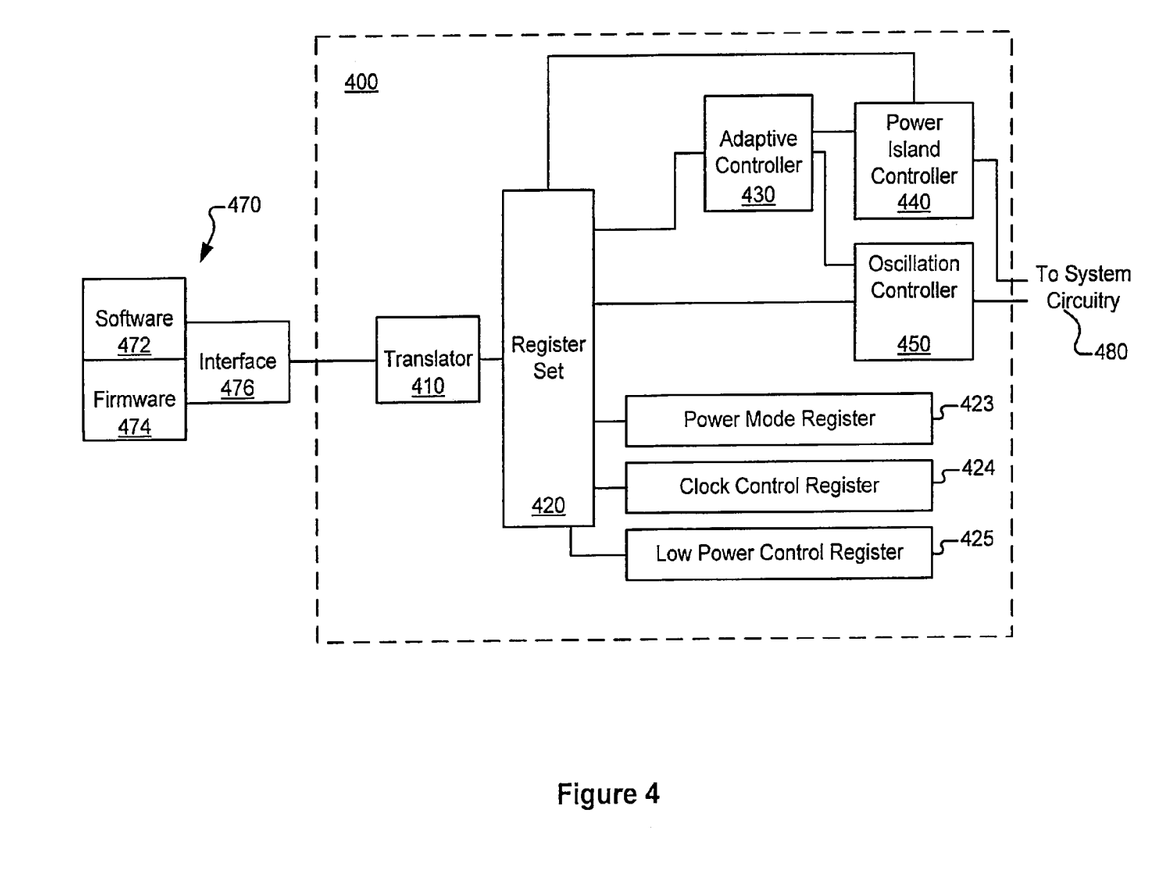
FIG. 4 illustrates a register based modular power management system in accordance with one or more embodiments of the present invention.

Turning to FIG. 4, a power management system 400 (shown in the dashed lines) that may be used in place of modular, adaptive power management module 110. Power management system 400 includes a translator module 410, a register set 420, an adaptive controller 430, a power island controller 440, and an oscillation controller 450. Translator 410 receives communications from an interface 476 that is operable to format commands from one or both of software 472 executing on a host device or firmware 474 embedded as part of a hard disk drive system. Power island controller 440 and oscillation controller 450 provide control outputs to various system circuitry 480. In some embodiments of the present invention, power management system 400 is only operable to receive commands from firmware 474. In such cases, firmware 474 may convert any commands from a host into commands tailored for implementation by power management system 400. Thus, for example, where a host controller executing software 472 requests operation in a standby mode, firmware 474 converts the received command to a command tailored to cause power management system 400 to operate in an interpretation of the requested standby mode. In addition, where an adaptive power management scheme is implemented, firmware 474 controls execution of the scheme by providing one or more commands to translator 410 via interface 476. In the aforementioned cases, translator 410 is relatively simple providing only a mechanism for writing the command to appropriate registers within register set 420.

Alternatively, in some embodiments of the present invention firmware control is not included. In such embodiments, translator 410 may be modified to receive host commands directly from software 472. In such a case, translator 410 may be designed to recognize one or more host commands such as, for example, commands for indicating a level of operation such as awake, standby and sleep. Upon recognizing the particular command, translator sets one or more registers in register set 420 to obtain an interpretation of each of the commands that is particularly tailored for the system in which power management system 400 is deployed.

Register set 420 includes a number of registers that may be set with values to control the operation of power management system 400. In one particular embodiment of the present invention, register set 420 includes a power mode register 223, a clock control register 224, and a low power control register 225. Power mode register 223 includes a number of bits dedicated to defining the power mode in which power management system 400 is operating. In particular, one embodiment of the present invention includes the nine register bits set forth in Table 1 below.

TABLE 1

Exemplary Power Mode Register

| Bit(s) | Name | R/W |
|---|---|---|
| 8:5 | Power State | R |
| 4 | Cartridge Wake | R/W |
| 3 | Processor Wake | R/W |
| 2 | Suicide | R/W |
| 1 | Sleep | R/W |
| 0 | Standby | R/W |

The four Power State bits are read only bits and are continuously updated to reflect the power state of the system in which power management system 400 is deployed. These register bits are maintained in the always on power domain and thus are always accessible either via firmware or to a host. In operation, these four Power State bits may be used to communicate an upcoming power state that is indicated by adaptive controller 430. When probed by the firmware, these Power State bits may be used as the impetus for selecting an upcoming adaptive power state. The Cartridge Wake bit when set to a logic '1' enables a defined external bit to operate as a wake-up command when power management system 400 is operating in either a standby or sleep mode. Similarly, the Processor Wake bit when set to a logic '1' enables a defined external bit to operate as a wake-up command for a processor executing firmware when power management system 400 is operating in either a standby or sleep mode.

The Suicide bit when set to a logic '1' forces power management system 400 to disable clocks to all modules except those necessary to revive operation of the system in which power management system 400 is deployed. Further, in some cases, setting the suicide bit causes removal of power from all non-essential power islands. Thus, the Suicide bit provides a single writable bit that can be used to fully shut-down system operation. In some embodiments, multiple "Suicide" bits are offered with each being tailored to reduce power consumption of one or more portions of a system in which power management system 400 is deployed. For example, a power island suicide bit that is operable to remove power from all non-essential power islands may be provided in addition to a clock suicide bit that is operable to gate all non-essential clocks. Such an approach provides an additional degree of flexibility in managing power in a given system. This degree of flexibility may be used, for example, to remove all non-essential clocks while at the same time maintaining power to the various power islands. This assures a more rapid return from a given power state at the cost of leakage current expended by circuitry associated with the power islands.

The Sleep bit is set to a logic '1' whenever a sleep mode is commanded by a host. It should be noted that this register bit is tailored for use where a host is commanding power modes consistent with a standard ATA bus. In other embodiments of the present invention, it may be that other bits are implemented to command power modes specific to another standard bus. In some cases, this bit is not set when power management system 400 is operating exclusively under firmware control. When this bit is set to a logic '1', clocks are removed from all portions of the system in which power management system 400 is deployed. As such, awaking the system typically relies on an external clock provided to only a limited portion of the design that is able to revive operation. Alternatively or in addition, operation may be revived when a reset is received. Further, when this bit is set, power is removed from all non-essential power islands. Power is restored under the same conditions that are used for restoring clocks, although power may be established some amount of time prior to re-establishing the clocks.

This Standby bit is set to a logic '1' whenever a standby mode is commanded by a host. Similar to the Sleep bit, it should be noted that this register bit is tailored for use where a host is commanding power modes consistent with a standard ATA bus. In other embodiments of the present invention, it may be that other bits are implemented to command power modes specific to another standard bus. In some cases, this bit is not set when power management system 400 is operating exclusively under firmware control. When this bit is set, clocks are removed from substantial portions of the system in which power management system 400 is deployed. Clocks are maintained over portions that govern power management and/or require substantial reboot time. The system awakes from this state any time a command is received either from a host or from firmware control.

As just some examples, where a low power mode is to be entered, the Suicide bit(s) is set under firmware control. Upon setting of the Suicide bit, power management system 400 forces all clocks (and in some cases power to be removed) from all non-essential modules of the system in which power management system 400 is deployed. Shutting down the clocks typically removes a considerable amount of power at the system level (and shutting down the power may further reduce any power consumption).

Upon a power on reset, all discrete I/O are enabled and the aforementioned register bits are initialized in their respective default states. Thus, the Suicide bit(s) are initialized in an inactive (i.e., logic '0') state. Further, at this point, power is provided to all power islands and all clocks are active. Such a powered on state is indicated by the Power State bits of Power Mode Register 223.

When the system in which power management system 400 is set to go into a power mode that is achievable using the Suicide bit(s) either adaptively or under firmware control, the firmware sets the Suicide bit(s) in accordance with the desired power state. Writing the Suicide bit(s) in Power Mode Register 223 allows power management system 400 to initiate the following actions in, for example, hard disk drive system 100. First, the clocks to the various modules in, for example, hard disk drive system 100 are disabled. This includes disabling the clock to the embedded processor on which the firmware is executing. This effectively kills the embedded processor and terminates all firmware activity. Second, power manager system 400 will set all register bits within register set 420 to reflect and implement the commanded state of operation. This may include shutting off an oscillator which is the source of all clocking, merely gating one or more clocks, and/or removing power from one or more power islands. Third, power manager system 400 may set bit that will allow the determined command to restore system operation. This may include, for example, causing a system restoration upon setting of an eternal bit, through a rudimentary host command and/or after a predetermined time period.

Clock control register 224 includes a number of bits dedicated to defining various clock control schemes that may be employed in relation to power manager system 400. Each of the bits of clock control register 224 controls the gating of a particular portion of circuitry with which power manager system 400 is associated. For example, where power manager system 400 is deployed in relation to hard disk drive system 100, one clock control bit may be associated with read channel module 130 and another associated with hard disk controller 140. This allows the clock to read channel module 130 to be gated, while at the same time the clock to hard disk controller 140 remains active. In addition, clock control register 224 may include a bit that gates the overall system clock and thereby gates all clocks. Yet further, clock control register 224 includes a bit that when set removes power from the oscillator altogether. It should be noted that clock control register 224 may include a number of words that are each individually addressable, readable and writable.

Low power control register 225 has a number of bits that provide for disabling groups of pull-up or pull-down resistors associated with one or more busses controlled by power manager system 400. Thus, for example, the pull-up resistors associated with a bus supplying data to one module may be separately controlled from a group of pull-up resistors associated with another bus supplying data to another module. This allows for flexible control of power dissipation related to various pull-up and pull-down resistors in a given design. In addition, low power control register 225 includes a number of bits designed to separately control application of power to one or more power islands under control of power manager system 400. Thus, power to each of the individual power islands of a given design can be separately controlled. Yet other bits of low power control register 225 are responsible for disabling groups of tri-state signal outputs. In this way, power dissipation associated with the various tri-state signal outputs can be minimized. Further, low power control register 225 may include a bit operable to awake any associated systems from a condition initiated by setting the Suicide bit of Power Mode Register 223. Additionally, low power control register 225 includes a bit operable to select an internally generated clock or an externally generated clock to operate the host interface. It should be noted that low power control register 225 may include a number of words that are each individually addressable, readable and writable.

Adaptive controller 430 operates to provide a hardwired adaptive power management scheme separate and apart from any firmware control. Thus, for example, one or more embodiments of the present invention may be implemented without the aid of a processor executing firmware. Alternatively, adaptive controller 430 may be used in relation to a system including a processor executing firmware to implement some of the functionality that would otherwise be implemented in firmware. As yet another alternative, power manager system 400 may be implemented without a hardwired adaptive controller 430. In some cases, hardwired adaptive controller 430 contains a group of hardware timers that are operable to indicate a duration in which power manager system 400 has been operating in a particular power state and to cause entry into a lower power state. Based on the disclosure provided herein, one of ordinary skill in the art will appreciate a variety of circuits that may be used in implementing adaptive control via hardwired adaptive controller 430.

In addition, power manager system 400 includes a power island controller 440 and an oscillation controller 450. Each of power island controller 440 and oscillation controller 450 provide signals to system circuitry 480 that implement various desired power states. In particular, power island controller 440 is operable to provide signals to system circuitry 480 that enables and disables power to one or more power islands in the system in which power manager system 400 is deployed. In some cases, power island controller 440 is merely a pass through (either buffered or unbuffered) of register bits included in register set 420. In other embodiments, power island controller 440 is operable to use register bits from register set 420 in addition to input from hardwired adaptive controller 430 to control power to the one or more power islands. Based on the disclosure provided herein, one of ordinary skill in the art will recognize a variety of circuitry that may be deployed to implement the aforementioned functionality of power island controller 440. Oscillation controller 450 is operable to provide either clock signals or clock enable signals to system circuitry 480. This provides power manager system 400 with an ability to turn-off or disable one or more clocks used to synchronize the various circuits within the system in which power manager system 400 is deployed. In some cases, oscillation controller 450 is merely a pass through (either buffered or unbuffered) of register bits included in register set 420. In other embodiments, oscillation controller 450 is operable to use register bits from register set 420 in addition to input from hardwired adaptive controller 430 to enable and/or disable one or more clocks. Based on the disclosure provided herein, one of ordinary skill in the art will recognize a variety of circuitry that may be deployed to implement the aforementioned functionality of oscillation controller 450.

Figure 5:
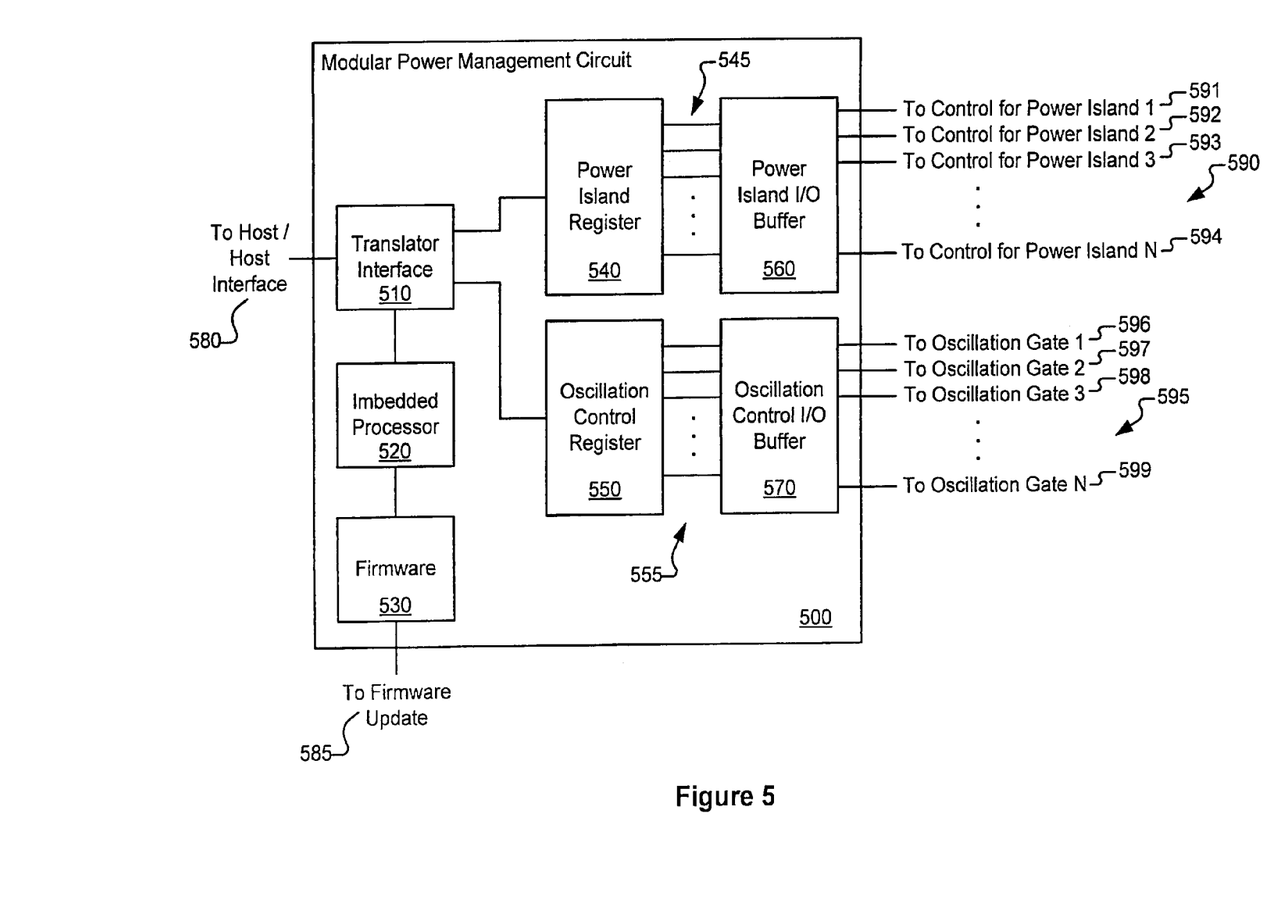
FIG. 5 depicts a reusable modular power management circuit in accordance with one or more embodiments of the present invention.

Turning to FIG. 5, a reusable modular power management circuit 500 in accordance with one or more embodiments of the present invention is depicted. Modular power management circuit 500 includes a translator interface 510 that may receive commands via a host or host interface 580. Thus, for example, where the host is an ATA hard disk drive system, various ATA commands may be provided to modular power management circuit 500 via translator interface 510. In turn, translator interface 510 converts the standardized command from host interface 580 into a power management command that is tailored to implement a power management scheme that is highly tailored to the system in which modular power management circuit 500 is deployed. In some cases, translator interface 510 is implemented via or communicably coupled to an embedded processor 520 that is capable of performing some or all of the translation function. Embedded processor 520 executes firmware 530 that can be updated via a firmware update interface 530. As such, power management implemented via modular power management circuit 500 may be modified post deployment to provide a different power management scheme depending upon a particular end user's needs.

In operation, translator interface 510 receives commands from a host 580 and converts the commands into register writes. In particular, translator interface 510 writes a power island register 540 and an oscillation control register 550. Each bit (545) of power island register 540 is associated with a respective bit of a power island I/O buffer 560, and each bit (555) of oscillation control register is associated with a respective bit of an oscillation control I/O buffer 570. Power island I/O buffer 560 drives a number of power island control signals 590 including power island controls 1-N (591-594). A designer can utilize each of power island control signals 591-594 to drive respective switches gating power to various power islands formed within the system in which modular power management circuit 500 is deployed. Similarly, oscillation control I/O buffer 570 drives a number of oscillation control signals 595 including oscillation control signals 1-N (596-599). A designer can utilize each of oscillation control signals 596-599 to drive respective circuitry turning off oscillators or gating clocks used within the system in which modular power management circuit 500 is deployed. Thus, as a particular example, one of oscillation control signals 596-599 may shut down a particular oscillator, another of oscillation control signals 596-599 may gate all clocks derived from the particular oscillator, and yet another of oscillation control signals 596-599 may gate some but not all of the clocks derived from the particular oscillator. These three distinct oscillation controls aid in implementing different levels of power management and/or increasing or decreasing the aggressiveness of power management within any level of power management. Based on the disclosure provided herein, one of ordinary skill in the art will appreciate the myriad of power management control that may be implemented using a modular power management circuit in accordance with embodiments of the present invention.

As just one particular example of the operation of modular power management circuit 500, translator interface 510 may receive an ATA sleep mode command from a host 580. In turn, translator interface 510 may convert the received command into a register write that causes one or more power islands to be shut down, and one or more clocks to be either turned off or gated. As such, modular power management circuit 500 provides a modular platform allowing a designer to easily implement a custom power management scheme interacting with standard power management commands. Thus, increased power management sophistication is possible through a reusable circuit.

In conclusion, the present invention provides novel systems, devices, methods and arrangements for power management. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A power management system, the power management system comprising:
   a translator interface operable to receive a host power command, wherein the host power command is operable to provide one of at least a first coarse power utilization and a second coarse power utilization;
   a first circuit portion and a second circuit portion;
   a power island controller, wherein the power island controller selectively controls power to each of the first circuit portion and the second circuit portion; and
   an oscillation controller, wherein the oscillation controller selectively governs a first clock provided to the first circuit portion and a second clock provided to the second circuit portion; and
   wherein the power management system is operable to direct a combination of the power island controller and the oscillation controller to implement one of at least a first fine power utilization within the first coarse power utilization and a second fine power utilization within the first coarse power utilization.

2. The power management system of claim 1, wherein the power management system further includes a processor, and wherein the processor is operable to execute the host power command in accordance with firmware instructions.

3. The power management system of claim 2, wherein execution of the firmware instructions is operable to implement an adaptive power management scheme.

4. The power management system of claim 2, wherein the power management system is deployed in relation to a device that includes the first circuit portion and the second circuit portion, and wherein the power island controller includes a first register bit writable by the processor and operable to disable power to the first circuit portion and a second register bit writable by the processor and operable to disable power to the second circuit portion.

5. The power management system of claim 4, wherein the first register bit and the second register bit are writable via the translator interface.

6. The power management system of claim 5, wherein a host is operable to implement a coarse power management scheme, wherein the power management system is accessible to the host via the translator interface, and wherein the processor is operable to implement a finer adaptive power management scheme.

7. The power management system of claim 1, wherein the oscillation controller is operable to disable the first clock while the power island controller directs application of power to the first circuit portion.

8. The power management system of claim 1, wherein the power management system is deployed in relation to a device that includes the first circuit portion and the second circuit portion, and wherein the oscillation controller includes a register bit writable by the processor and operable to disable both the first clock to the first circuit portion while the power island controller directs application of power to the first circuit portion.

9. The power management system of claim 8, wherein the register bit is further operable to disable an oscillator from which the first clock and the second clock are derived.

10. The power management system of claim 1, wherein the power management system further includes a translator interface, wherein the translator interface is operable to at least in part control operation of the power island controller and the oscillation controller.

11. The power management system of claim 10, wherein the translator interface is selected from a group consisting of: an ATA interface, a SATA interface, an MMC interface, CE-ATA interface, and an SDIO interface.

12. The power management system of claim 1, wherein the power management system is register based, and wherein the power management system is deployable in relation to a variety of host systems.

13. The power management system of claim 12, wherein one of the variety of host systems is a hard disk drive system.

14. The power management system of claim 1, wherein the power management system is operable to select between a first power state and a second power state for the first circuit portion, wherein the power management system includes an adaptive power management control, and wherein the adaptive power management control is operable to select an interim power state between the first power state and the second power state for the first circuit portion.

15. The power management system of claim 14, wherein the first power state is selected via a host interface, and the interim power state is adaptively selected internal to the power management system.

16. A reusable, modular power management circuit for use in a variety of systems, the power management circuit comprising:
   a power island control register, wherein the power island control register is associated with a plurality of power island control bits, and wherein each of the plurality of power island control bits is operable to disable power to a given power island;
   an oscillation control register, wherein the oscillation control register is associated with a plurality of oscillation control bits, and wherein each of the plurality of oscillation control bits is operable to disable a clock associated with a particular power island independent of whether power is applied to the particular power island; and a translator interface, wherein the translator interface is operable to receive a standard power management command operable to select one of at least a first coarse power utilization and a second coarse power utilization and to translate the standard power management command into a write to the power island control register and the oscillation control register, and wherein the write to the power island control register and the oscillation control register implements a tailored power management scheme, wherein the tailored power management scheme implements one of at least a first fine power utilization within the first coarse power utilization and a second fine power utilization within the first coarse power utilization.

17. The power management circuit of claim 16, the circuit further comprising:

an embedded processor executing firmware, wherein the embedded processor at least in part controls operation of the translator interface.

18. The power management circuit of claim 17, wherein the firmware is upgradeable.

19. The power management circuit of claim 16, wherein a first of the plurality of oscillation control bits is operable to disable an oscillator, wherein a second of the oscillation control bits is operable to gate all clocks derived from the oscillator, and wherein a third of the oscillation control bits is operable to gate less than all clocks derived from the oscillator.

20. The power management circuit of claim 16, wherein the standard command is selected from a group consisting of: an ATA command and an SATA command.

21. A hard disk drive system, wherein the hard disk drive system includes:

a hard disk controller;

an interface controller;

a read channel module, wherein the hard disk controller, the interface controller, and the read channel module are implemented across at least a first circuit portion and a second circuit portion;

a power manager system including:

a translator interface operable to receive a host power command, wherein the host power command is operable to provide one of at least a first coarse power utilization and a second coarse power utilization;

a power island controller, wherein the power island controller selectively controls power to each of the first circuit portion and the second circuit portion;

an oscillation controller, wherein the oscillation controller selectively governs a first clock provided to the first circuit portion and a second clock provided to the second circuit portion; and wherein the power management system is operable to direct a combination of the power island controller and the oscillation controller to implement one of at least a first fine power utilization within the first coarse power utilization and a second fine power utilization within the first coarse power utilization.

22. The hard disk drive system of claim 21, wherein the hard disk controller, the interface controller, the read channel module and the power manager system utilize two or more distinct clocks, and wherein the two or more distinct clocks are each controlled by the power manager system.

23. The hard disk drive system of claim 21, wherein the interface controller is operable to provide a translator interface selected from a group consisting of: an ATA interface, an SATA interface, an MMC interface, a CE-ATA interface, and an SDIO interface.

24. The hard disk drive system of claim 21, wherein the hard disk drive system further includes:

a processor executing firmware, wherein the firmware is operable to implement an adaptive power management scheme via the power manager system.

25. The hard disk drive system of claim 24, wherein the interface controller is operable to provide a translator interface, wherein the translator interface is operable to receive a host command that causes a selected power mode to be implemented via the power manager system.

* * * * *